United States Patent
Shi et al.

(10) Patent No.: US 8,868,076 B2
(45) Date of Patent: Oct. 21, 2014

(54) INFORMATION METHOD AND SYSTEM OF A USER ACCESS MODE TO PROVIDE ACCESS CONTROL FOR HANDOVER TO A TARGET HOME (E)NODEB

(75) Inventors: Xiaojuan Shi, Shenzhen (CN); Yun Deng, Shenzhen (CN); Lin Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 196 days.

(21) Appl. No.: 13/257,862

(22) PCT Filed: Mar. 3, 2010

(86) PCT No.: PCT/CN2010/070854
§ 371 (c)(1),
(2), (4) Date: Nov. 7, 2011

(87) PCT Pub. No.: WO2010/145222
PCT Pub. Date: Dec. 23, 2010

(65) Prior Publication Data
US 2012/0108244 A1    May 3, 2012

(30) Foreign Application Priority Data
Jun. 18, 2009   (CN) .......................... 2009 1 0087091

(51) Int. Cl.
*H04W 36/00* (2009.01)
*H04W 4/00* (2009.01)
*H04W 84/04* (2009.01)

(52) U.S. Cl.
CPC ........ *H04W 36/0022* (2013.01); *H04W 84/045* (2013.01)
USPC ............................ 455/436; 455/428; 370/331

(58) Field of Classification Search
CPC ....... H04W 76/02; H04W 76/21; H04W 8/18; H04W 8/22; H04W 8/24; H04W 8/186; H04W 28/26; H04W 36/00; H04W 36/08; H04W 36/18; H04W 36/0016; H04W 84/45

USPC ................................... 455/436, 438; 370/331
See application file for complete search history.

(56) References Cited

U.S. PATENT DOCUMENTS 5,771,453 A    6/1998   Haartsen
(Continued)

FOREIGN PATENT DOCUMENTS

CN    1193448 A    9/1998
(Continued)

OTHER PUBLICATIONS

International Search Report in international application No. PCT/CN2010/070854, mailed on Jun. 3, 2010.
(Continued)

*Primary Examiner* — Wesley Kim
(74) *Attorney, Agent, or Firm* — Oppedahl Patent Law Firm LLC (57) ABSTRACT

The present invention discloses an information method of a user access mode, and the method comprises: when attempting to hand over a User Equipment (UE) to a target hybrid home (e)NodeB cell, a network element at a network side informs a target hybrid home (e)NodeB of a current user access mode of the UE via a handover signaling, wherein the user access mode is information on whether or not the UE is a member user of the target hybrid home (e)NodeB cell. The present invention further discloses an information system of a user access mode, in which an informing unit at a network side is used for a network element at the network side to inform, when attempting to hand over a UE to a target hybrid home (e)NodeB cell, a target hybrid home (e)NodeB of a current user access mode of the UE via a handover signaling. By using the method and system of the present invention, when the network attempts to hand over a UE to a target hybrid home (e)NodeB cell, the informing of a user access mode is realized to guarantee the priority of a member user of the hybrid home (e)NodeB in access and resource allocation.

11 Claims, 6 Drawing Sheets

(56) References Cited

U.S. PATENT DOCUMENTS

| | | | |
|---|---|---|---|
| 2009/0316655 A1* | 12/2009 | Prakash et al. | 370/331 |
| 2011/0092213 A1* | 4/2011 | Forsberg et al. | 455/436 |
| 2011/0165878 A1* | 7/2011 | Nylander et al. | 455/436 |
| 2011/0281584 A1* | 11/2011 | Sander et al. | 455/436 |
| 2011/0286429 A1* | 11/2011 | Vikberg et al. | 370/331 |

FOREIGN PATENT DOCUMENTS

| | | |
|---|---|---|
| CN | 101330704 A | 12/2008 |
| EP | 2048901 A1 | 4/2009 |
| JP | 2011523308 A | 8/2011 |
| JP | 2012526468 A | 10/2012 |
| KR | 20090008055 A | 1/2009 |

OTHER PUBLICATIONS

English Translation of the Written Opinion of the International Search Authority in international application No. PCT/CN2010/070854, mailed on Jun. 3, 2010.

Overview of 3GPP Release 9 V0.0.5 Apr. 2009.

Discussion of Inbound Handove Mar. 23-26, 2009.

* cited by examiner

INFORMATION METHOD AND SYSTEM OF A USER ACCESS MODE TO PROVIDE ACCESS CONTROL FOR HANDOVER TO A TARGET HOME (E)NODEB

TECHNICAL FIELD

The present invention relates to the field of mobile communications, and more particularly to an information method and system of a user access mode for a handover to a hybrid home (e)NodeB cell.

BACKGROUND

A home (e)NodeB, a small-sized plug-and-play (e)NodeB deployed in a home, a group, a company, a school and other private places as resources dedicated to private users, is capable of providing users a higher service rate, reducing the cost on using a high-rate service, and making up for the disadvantages in the coverage of an existing distributed cellular radio communication system.

Figure 1:
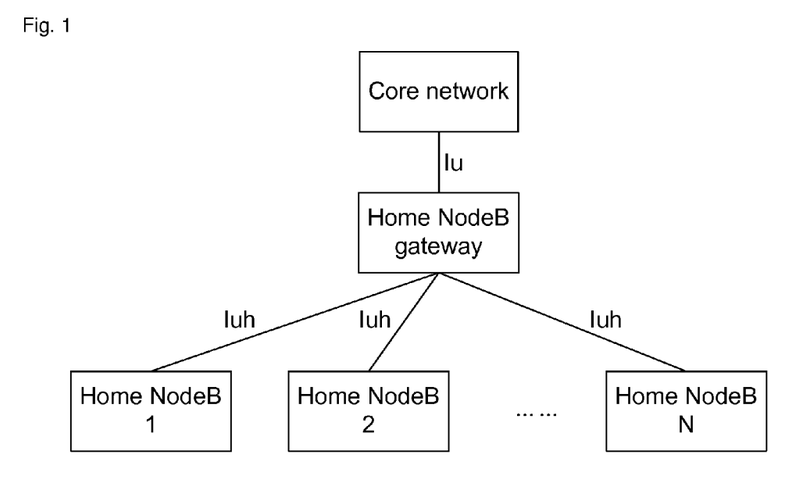
FIG. 1 is a schematic diagram illustrating a network layout of a home NodeB in the architecture of an existing UMTS.
Figure 2:
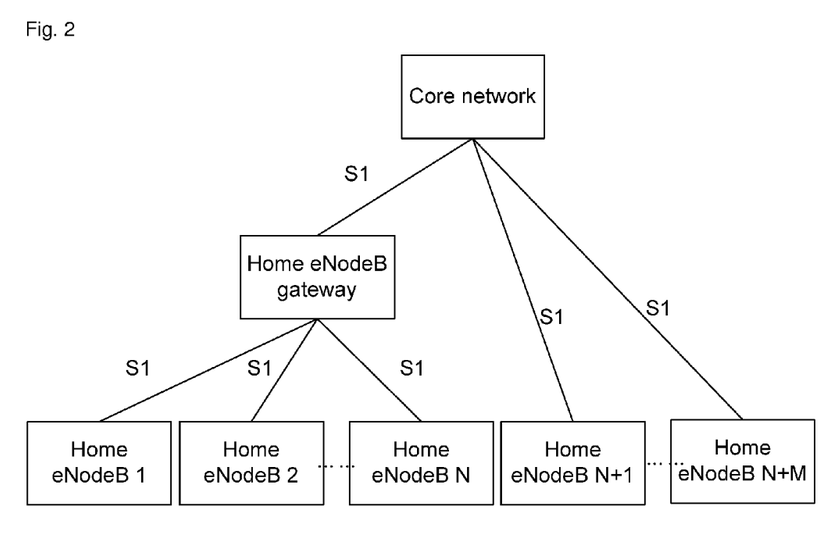
FIG. 2 is a schematic diagram illustrating a network layout of a home eNodeB in the architecture of an existing LTE.

A user of a home (e)NodeB is connected to a core network via a Home (e)NodeB Access Network (H(e)NB AN). FIG. 1 is a schematic diagram illustrating a network layout of a home (e)NodeB in the architecture of a Universal Mobile Telecommunications System (UMTS), as shown in FIG. 1, the H(e)NB AN consists of a home (e)NodeB and a Home (e)NodeB Gateway (H(e)NB GW), wherein the home (e)NodeB and the home (e)NodeB gateway are connected with each other via an Iuh interface, and the home (e)NodeB gateway and the core network are connected with each other via an Iu interface. Here, the H(e)NB GW mainly functions to validate the security of the home (e)NodeB, process the registration and the de-registration of the home (e)NodeB, perform access control on the home (e)NodeB, maintain and manage the running of the home (e)NodeB, configure and control the home (e)NodeB according to requirements of an operator, and take charge of the data exchange between the core network and the home (e)NodeB. An evolved home (e)NodeB may be directly connected to the core network, needing no home eNodeB gateway. FIG. 2 is a schematic diagram illustrating a network layout of a home eNodeB in the architecture of a Long-Term Evolution (LTE), as shown in FIG. 2, a home eNodeB and a home eNodeB gateway are connected with each other via an S1 interface, and the home eNodeB gateway and a core network are also connected with each other via the S1 interface.

The home (e)NodeB is deployed in a home, a company, a school and other private locations as resources dedicated to private users, and cells covered by the home (e)NodeB form a home (e)NodeB coverage area. A cell covered by a macro (e)NodeB is referred to as a macro cell, a cell covered by a home (e)NodeB is referred to as a home (e)NodeB cell, and each home (e)NodeB has its own home (e)NodeB identifier. Currently, there are totally three access modes available for the home (e)NodeB: an open mode, a closed mode and a hybrid mode, wherein in the open mode, a home (e)NodeB allows the access of all users, and a corresponding home (e)NodeB cell is referred to as an open home (e)NodeB cell; in the closed mode, a home (e)NodeB only allows the access of an authorized user, such as an authorized family member and a group user and the like, such authorized users form a Closed Subscriber Group (CSG), an authorized user is referred to as a member user, that is, a member use of the CSG, and correspondingly, a cell covered by a home (e)NodeB in the closed mode is referred to as a closed home (e)NodeB cell (CSG cell for short); and in the hybrid mode, a home (e)NodeB also has a CSG and allows the access of a member user as well as a nonmember user, that is, a user who does not belong to the CSG if not being authorized, wherein the member user has priority in service quality guarantee and resource allocation and can enjoy a discount in fee, and a cell covered by a home (e)NodeB in the hybrid mode is referred to as a hybrid home (e)NodeB cell.

A closed home (e)NodeB cell and a hybrid home (e)NodeB cell each have a Cell Global Identifier (CGI) and a Closed Subscriber Group Identifier (CSG ID), wherein the CGI is used for uniquely identifying a home (e)NodeB in a Public Land Mobile Network (PLMN). When a home (e)NodeB is powered on and registered, a home (e)NodeB gateway can obtain the CGI, the access mode and the CSG ID of a cell covered by the home (e)NodeB, and when a home eNodeB is directly connected with a core network, the core network can obtain the CGI, the access mode and the CSG ID of a cell covered by the directly-connected home eNodeB. A Universal Subscriber Identity Module (USIM) of a User Equipment (UE) stores an allowed CSG list of the UE, in which all the CSG IDs accessible to the UE are recorded. If the allowed CSG list is empty, that is, there is no CSG ID information in the allowed CSG list, it is indicated that the UE has subscribed no any CSG. The UE determines whether the UE is a member user of a closed home (e)NodeB cell or a hybrid home (e)NodeB cell according to the allowed CSG list information and the CSG ID information of the closed home (e)NodeB cell or the hybrid home (e)NodeB cell stored in the USIM. The core network stores the allowed CSG list information of each UE and can also determine whether the UE is a member user of a closed home (e)NodeB cell or a hybrid home (e)NodeB cell according to the allowed CSG list information of each UE and the CSG ID information of the closed home (e)NodeB cell or the hybrid home (e)NodeB cell. In the UMTS, a home (e)NodeB gateway stores International Mobile Subscriber Identification number (IMSI) information of each UE, which is allowed to access a home (e)NodeB belonging to the home (e)NodeB gateway, and the home (e)NodeB identifier of each home (e)NodeB. In the LTE system, a home eNodeB gateway can also acquire allowed CSG list information of a UE from a core network, therefore, a home eNodeB gateway may also determine whether a UE is a member user of a closed home eNodeB cell or a hybrid home eNodeB cell according to the IMSI information or the allowed CSG list information of the UE as well as the CSG ID information or the home eNodeB identifier of the closed home eNodeB cell or the hybrid home eNodeB cell.

Indoor coverage is of the highest importance in the construction of a radio network system, an appropriate indoor coverage solution can, on one hand, maximize the effect of a network system to create greater value for an operator, and on the other hand, can lower the network construction cost of the operator to achieve a high return at a low cost, the home (e)NodeB is just developed to meet this demand. After the home (e)NodeB is introduced, in order to guarantee the continuity of services and meet a demand on mobility, a handover between a macro cell and a home (e)NodeB cell or a handover between home (e)NodeB cells is inevitable if the quality of a serving cell in a connected state is lowered, or there is a more appropriate neighbor home (e)NodeB cell whose signal quality meets a given condition, or a load balance is needed at a network side. As described above, the hybrid home (e)NodeB cell allows the access of both a member user and a nonmember user on a premise of guaranteeing the priority of a member user in service quality and resource allocation, for instance, if the load of a hybrid home (e)NodeB cell is almost saturated and there are two UEs, a member user and a nonmember user of a home (e)NodeB, desiring to be handed over to the hybrid home (e)NodeB cell while only the access of one UE is allowed, then the home (e)NodeB allows the handover of the member user to the home (e)NodeB cell and declines the handover request of the nonmember user; similarly, when the load of a hybrid home (e)NodeB cell is almost saturated, in order to guarantee the successful access of other member users, the hybrid home (e)NodeB cell can hand over the accessed nonmember user to another cell or decreases resources scheduled to the nonmember user ahead.

In conclusion, whether the network attempts to hand over a UE from a macro cell to a hybrid home (e)NodeB cell or hand over a UE from a home (e)NodeB cell in other mode to the hybrid home (e)NodeB cell, the hybrid home (e)NodeB cell must be informed of the user access mode (that is, as a member user or a nonmember user) of the UE so as to guarantee the prior access of a member user, therefore, it is necessary to inform the hybrid home (e)NodeB cell of the user access mode so that the hybrid home (e)NodeB cell can guarantee the prior access of a member user according to the user access mode. However, there has been proposed no scheme to inform of a user access mode.

SUMMARY

On this ground, it is the main object of the present invention is to provide an information method and system of a user access mode which can inform of a user access mode of a UE, when a network attempts to hand over a UE to a hybrid home (e)NodeB cell, so as to guarantee the priority of a member user of the hybrid home (e)NodeB in access and resource allocation.

In order to achieve the object above, the technical solution of the present invention is realized as follows.

An information method of a user access mode comprises: when attempting to hand over a User Equipment (UE) to a target hybrid home (e)NodeB cell, a network element at a network side informing a target hybrid home (e)NodeB of a current user access mode of the UE via a handover signaling, wherein the user access mode may be information on whether or not the UE is a member user of the target hybrid home (e)NodeB cell.

Wherein the method may further comprise: the UE or the network element at the network side determining the user access mode of the UE.

Wherein the network element at the network side may be a network element at a source network side, a network element at a core network side, or a network element at a target network side.

Wherein the network element at the source network side may be a source eNodeB, a source radio network controller, or a source home (e)NodeB gateway.

Wherein the network element at the core network side may be a mobility management entity, a serving GPRS supporting node, or a mobile service switching center.

Wherein the network element at the target network side may be a home (e)NodeB gateway.

Wherein in the case that access control is carried out by the network element at the source network side, the method may further comprise:

the network element at the source network side determines whether or not the UE is a member user of the target hybrid home (e)NodeB cell, determines the user access mode, and encapsulates the user access mode in the handover signaling and informs the target hybrid home (e)NodeB of the user access mode in the handover signaling; and the target hybrid home (e)NodeB acquires the user access mode, allows the access of the UE if the user access mode indicates that the UE is a member user of the target hybrid home (e)NodeB cell, or selectively allows the access of the UE according to current related information of the home (e)NodeB if the user access mode indicates that the UE is a nonmember user of the target hybrid home (e)NodeB cell;

or, in the case that access control is carried out by the network element at the core network side, the method may further comprise:

the network element at the core network side determines whether or not the UE is a member user of the target hybrid home (e)NodeB cell, determines the user access mode, and encapsulates the user access mode in the handover signaling and informs the target hybrid home (e)NodeB of the user access mode in the handover signaling; and the target hybrid home (e)NodeB acquires the user access mode, allows the access of the UE if the user access mode indicates that the UE is a member user of the target hybrid home (e)NodeB cell, or selectively allows the access of the UE according to current related information of the home (e)NodeB if the user access mode indicates that the UE is a nonmember user of the target hybrid home (e)NodeB cell;

or, in the case that access control is carried out by the network element at the target network side, the method may further comprise:

the network element at the target network side determines whether or not the UE is a member user of the target hybrid home (e)NodeB cell, determines the user access mode, and encapsulates the user access mode in the handover signaling and informs the target hybrid home (e)NodeB of the user access mode in the handover signaling; and the target hybrid home (e)NodeB acquires the user access mode, allows the access of the UE if the user access mode indicates that the UE is a member user of the target hybrid home (e)NodeB cell, or selectively allows the access of the UE according to current related information of the home (e)NodeB if the user access mode indicates that the UE is a nonmember user of the target hybrid home (e)NodeB cell.

Wherein the user access mode may be indicated in the following way:

the UE is indicated to be a member user or a nonmember user of the target hybrid home (e)NodeB cell by respective explicit identifier; or the UE is indicated to be a member user of the target hybrid home (e)NodeB cell by an explicit identifier, and the UE is indicated to be a nonmember user of the target hybrid home (e)NodeB cell by the absence of an explicit identifier.

Wherein the step that the network element at the source network side informs the target hybrid home (e)NodeB of the user access mode may further comprise:

the network element at the source network side sends a relocation required/handover required to the core network, wherein the user access mode is encapsulated in the relocation required/handover required;

the core network acquires the user access mode, encapsulates the user access mode in a relocation request/handover request and then sends the relocation request/handover request to the target home (e)NodeB gateway; and the target home (e)NodeB gateway forwards the relocation request/handover request to the target hybrid home (e)NodeB;

or, the step that the network element at the core network side informs the target hybrid home (e)NodeB of the user access mode may further comprise:

the network element at the source network side sends a relocation required/handover required to the core network;

the core network sends a relocation request/handover request to the target home (e)NodeB gateway, wherein the user access mode is encapsulated in the relocation request/handover request; and the target home (e)NodeB gateway forwards the relocation request/handover request to the target hybrid home (e)NodeB;

or, the step that the network element at the target network side informs the target hybrid home (e)NodeB of the user access mode may further comprise:

the network element at the source network side sends a relocation required/handover required to the core network;

the core network sends a relocation request/handover request to the target home (e)NodeB gateway; and the target home (e)NodeB gateway sends a relocation request/handover request to the target hybrid home (e)NodeB, wherein the user access mode is encapsulated in the relocation request/handover request.

An information system of a user access mode comprises: an informing unit at a network side, which is used for a network element at the network side to inform, when attempting to hand over a UE to a target hybrid home (e)NodeB cell, a target hybrid home (e)NodeB of a current user access mode of the UE via a handover signaling, wherein the user access mode may be information on whether or not the UE is a member user of the target hybrid home (e)NodeB cell.

Wherein the system may further comprise a determination unit, which is used for the UE or the network element at the network side to determine whether or not the UE is a member user of the target hybrid home (e)NodeB cell and determine the user access mode.

Wherein the informing unit may further comprise an indication module, which is used for indicating whether or not the UE is a member user of the target hybrid home (e)NodeB cell, wherein the UE is indicated to be a member user or a nonmember user of the target hybrid home (e)NodeB cell by respective explicit identifier; or the UE is indicated to be a member user of the target hybrid home (e)NodeB cell by an explicit identifier, and the UE is indicated to be a nonmember user of the target hybrid home (e)NodeB cell by the absence of an explicit identifier.

In the present invention, when attempting to hand over a User Equipment (UE) to a target hybrid home (e)NodeB cell, a network element at a network side informs a target hybrid home (e)NodeB of a current user access mode of the UE via a handover signaling, wherein the user access mode is information on whether or not the UE is a member user of the target hybrid home (e)NodeB cell.

The present invention can inform a user access mode of a UE to enable a target hybrid home (e)NodeB cell to guarantee the priority of a member user of the target hybrid home (e)NodeB cell in access and resource allocation according to the acquired user access mode, and therefore effectively guarantee the service priority and the resource priority of a member user when the UE attempts to be handed over to the target hybrid home (e)NodeB cell.

DETAILED DESCRIPTION

The fundamental idea of the present invention lies in that: when attempting to hand over a UE to a target hybrid home (e)NodeB cell, a network element at a network side informs a target hybrid home (e)NodeB of a current user access mode of the UE via a handover signaling.

The implementation of the technical solution is described below in detail by reference to the drawings.

An information method of a user access mode comprises: when attempting to hand over a UE to a target hybrid home (e)NodeB cell, a network element at a network side informs a target hybrid home (e)NodeB of a current user access mode of the UE via a handover signaling, wherein the user access mode is information on whether or not the UE is a member user of the target hybrid home (e)NodeB cell.

Here, the method further comprises: the UE or the network element at the network side determines whether or not the UE is a member user of the target hybrid home (e)NodeB cell and determines a user access mode.

Here, the network element at the network side is a network element at a source network side, a network element at a core network side, or a network element at a target network side.

In the method, the network element at the source network side comprises a source eNodeB, a source radio network controller, or a source home (e)NodeB gateway.

In the method, the network element at the core network side comprises a Mobility Management Entity (MME), a Serving GPRS Supporting Node (SGSN), or a Mobile service Switching Center (MSC).

In the method, the network element at the target network side comprises a home (e)NodeB gateway.

The present invention is realized in different ways if access control is carried out by different network elements, below is the specific description on the realization of the present invention in different cases.

Case 1: access control is carried out by a network element at a source network side when it attempts to hand over a UE to a target hybrid home (e)NodeB cell, in this case, the method further comprises.

Step 101: the network element at the source network side determines whether or not the UE is a member user of the target hybrid home (e)NodeB cell, determines a user access mode, and encapsulates the user access mode in a handover signaling and informs the target hybrid home (e)NodeB of the user access mode in the handover signaling; and Step 102: after receiving the handover signaling, the target hybrid home (e)NodeB acquires the user access mode, allows the access of the UE if the user access mode indicates that the UE is a member user of the target hybrid home (e)NodeB cell, or selectively allows the access of the UE according to current related information of the home (e)NodeB if the user access mode indicates that the UE is a nonmember user of the target hybrid home (e)NodeB cell, wherein the current related information of the home (e)NodeB comprises the current load condition and the resource utilization condition of the home (e)NodeB.

Case 2: access control is carried out by a network element at a core network side when it attempts to hand over a UE to a target hybrid home (e)NodeB cell, in this case, the method further comprises.

Step 111: the network element at the core network side determines whether or not the UE is a member user of the target hybrid home (e)NodeB cell, determines a user access mode, and encapsulates the user access mode in a handover signaling and informs the target hybrid home (e)NodeB of the user access mode in the handover signaling; and Step 112: after receiving the handover signaling, the target hybrid home (e)NodeB acquires the user access mode, allows the access of the UE if the user access mode indicates that the UE is a member user of the target hybrid home (e)NodeB cell, or selectively allows the access of the UE according to the current related information of the home (e)NodeB if the user access mode indicates that the UE is a nonmember user of the target hybrid home (e)NodeB cell, wherein the current related information of the home (e)NodeB comprises the current load condition and the resource utilization condition of the home (e)NodeB.

Case 3: access control is carried out by a network element at a target network side when it attempts to hand over a UE to a target hybrid home (e)NodeB cell, in this case, the method further comprises.

Step 121: the network element at the target network side determines whether or not the UE is a member user of the target hybrid home (e)NodeB cell, determines a user access mode, and encapsulates the user access mode in a handover signaling and informs the target hybrid home (e)NodeB of the user access mode in the handover signaling; and Step 122: after receiving the handover signaling, the target hybrid home (e)NodeB acquires the user access mode, allows the access of the UE if the user access mode indicates that the UE is a member user of the target hybrid home (e)NodeB cell, or selectively allows the access of the UE according to current related information of the home (e)NodeB if the user access mode indicates that the UE is a nonmember user of the target hybrid home (e)NodeB cell, wherein the current related information of the home (e)NodeB comprises the current load condition and the resource utilization condition of the home (e)NodeB.

Here, the user access mode indicates whether or not the UE is a member user of the target hybrid home (e)NodeB cell in the following ways:

the UE is indicated to be a member user or a nonmember user of the target hybrid home (e)NodeB cell by respective explicit identifier; or the UE is indicated to be a member user of the target hybrid home (e)NodeB cell by an explicit identifier, and the UE is indicated to be a nonmember user of the target hybrid home (e)NodeB cell by the absence of an explicit identifier.

Here, the present invention is realized in different ways if different system architectures are adopted and different network elements informs the target hybrid home (e)NodeB of the user access mode, below is the specific description on the realization of the present invention in different cases.

Case 1: the step that the network element at the source network side informs the target hybrid home (e)NodeB of the user access mode further comprises.

Step 201: the network element at the source network side sends a relocation required/handover required to a core network, wherein the user access mode is encapsulated in the relocation required/handover required; and Step 202: the core network acquires the user access mode, encapsulates the user access mode in a relocation request/handover request and then sends the relocation request/handover request to the target home (e)NodeB gateway; and the target home (e)NodeB gateway forwards the relocation request/handover request to the target hybrid home (e)NodeB.

Case 2: the step that the network element at the core network side informs the target hybrid home (e)NodeB of the user access mode further comprises.

Step 211: the network element at the source network side sends a relocation required/handover required to a core network; and Step 212: the core network sends a relocation request/handover request to the target home (e)NodeB gateway, wherein the user access mode is encapsulated in the relocation request/handover request; and the target home (e)NodeB gateway forwards the relocation request/handover request to the target hybrid home (e)NodeB.

Case 3: the step that the network element at the target network side informs the target hybrid home (e)NodeB of the user access mode further comprises.

Step 221: the network element at the source network side sends a relocation required/handover required to a core network;

Step 222: the core network sends a relocation request/handover request to the target home (e)NodeB gateway; and Step 223: the target home (e)NodeB gateway sends a relocation request/handover request to the target hybrid home (e)NodeB, wherein the user access mode is encapsulated in the relocation request/handover request.

It should be noted here that there are three access modes available for a home (e)NodeB: an open mode, a closed mode and a hybrid mode, wherein a closed home (e)NodeB only allows the access of a member user of its closed subscriber group, and an open home (e)NodeB and a hybrid home (e)NodeB allow the access of all the user equipments, wherein the hybrid home (e)NodeB needs to guarantee the prior access of a member user. When a UE attempts to access a home (e)NodeB via a cell selection or via a handover, a network side needs to determine the access mode of a home (e)NodeB, if it determines the access mode is an open mode, the access of all users is allowed; if it determines the access mode is a closed mode, the access of a member user is allowed; if it determines the access mode is a hybrid mode and resources of the home (e)NodeB are sufficient to guarantee the service quality and resource demands for all the accessed users, the access of all the users is allowed; and if it determines the access mode is a hybrid mode and the home (e)NodeB is heavily loaded, the access of a member user is allowed and the access of a nonmember user is declined, or the access of all users is allowed on a premise of guaranteeing the priority of a member user in resource allocation, that is, the service quality for a nonmember user is not guaranteed, this process is called as an access control process.

Taking a typical handover from a macro cell to a home (e)NodeB cell as an example, access control may be carried out on different network nodes during a handover process, below is detailed description on the access control:

1. the access control is carried out at a handover source network side, that is, a source eNodeB, a source radio network controller or a source home (e)NodeB gateway acquires the access mode, the CSG ID and other information of a target home (e)NodeB cell and the allowed CSG list information of a UE, carries out access control according to the acquired information, and determines whether or not the access of the UE to the target home (e)NodeB cell is allowed.

2. the access control is carried out at a core network side, that is, an MME, an SGSN or an MSC carries out the access control according to the stored allowed CSG list, and the acquired access mode, CSG ID and other information of a target home (e)NodeB cell, and determines whether or not the access of the UE to the target home (e)NodeB cell is allowed.

3. the access control is carried out at a handover target network side, that is, in the case that a target home (e)NodeB is connected to a core network via a home (e)NodeB gateway, the target home (e)NodeB gateway carries out access control according to the access mode, the CSG ID, the H(e)NB ID and other information of the target home node cell and the IMSI of a UE or the acquired allowed CSG list of the UE, and determines whether or not the access of the UE to the target home (e)NodeB cell is allowed.

The present invention is described below in detail by reference to specific examples.

Method Embodiment 1

Access control is carried out by a network element at a source network side.

Figure 3:
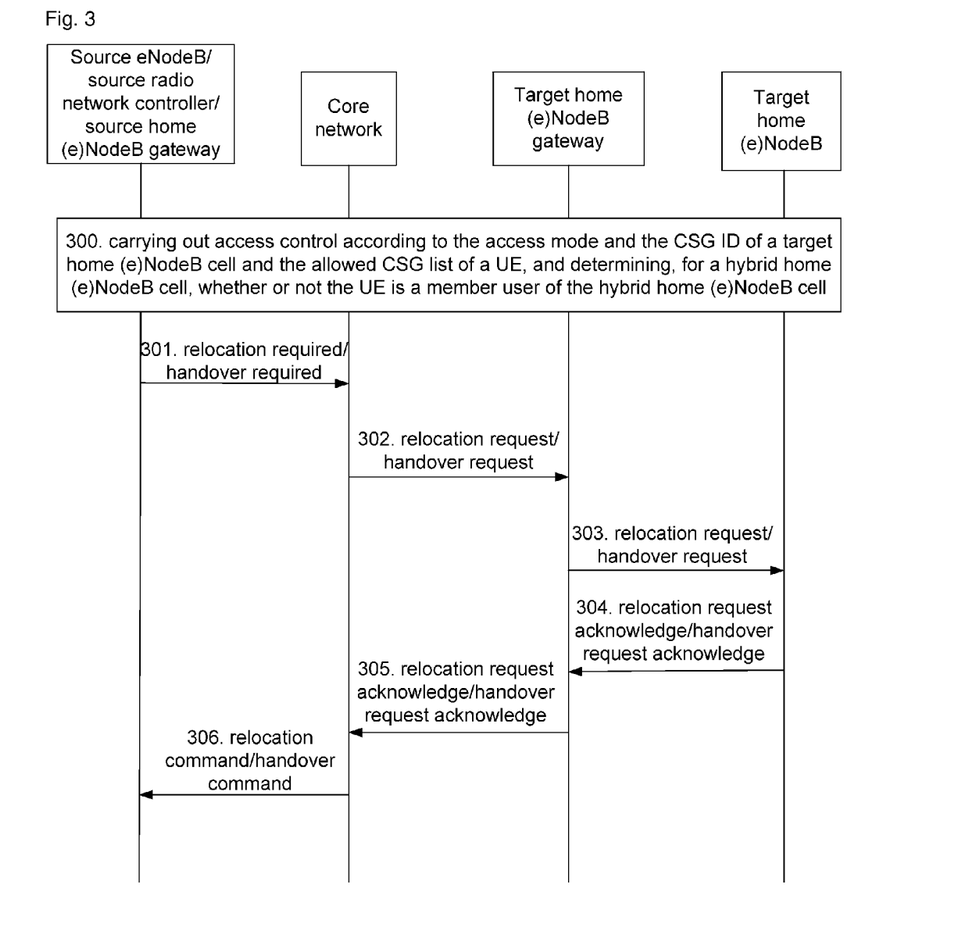
FIG. 3 is a schematic diagram illustrating a realization flow of embodiment 1 of the method of the present invention.

FIG. 3 is a schematic diagram illustrating a realization flow of the informing of a user access mode when access control is carried out at a source network side during a handover to a hybrid home (e)NodeB cell, the source network side herein refers to a source eNodeB/source radio network controller/source home (e)NodeB gateway. This embodiment is applicable to the handover from a macro cell to a hybrid home (e)NodeB cell in a UMTS system, where access control is carried out by a source radio network controller. This embodiment is also applicable to the handover from a macro eNodeB to a hybrid home eNodeB cell in an LTE system, where access control is carried out by a source eNodeB. This embodiment is also applicable to the handover from a home (e)NodeB to a hybrid home (e)NodeB cell in a UMTS system, or the handover from a home (e)NodeB connected to a core network via a home (e)NodeB gateway to a hybrid home (e)NodeB cell in an LTE system, where access control is carried out by a source home (e)NodeB gateway.

In order to make this embodiment more typical, it is assumed in FIG. 3 that a target home eNodeB is connected to a core network via a home eNodeB gateway when this embodiment is applied to an LTE system, and the method comprises the following steps.

Step 300: a source eNodeB/source radio network controller/source home (e)NodeB gateway acquires an access mode and a CSG ID of a target home (e)NodeB cell and an allowed CSG list of a UE, and carries out access control according to the acquired information, that is, allows the access of all users if the access mode of the target home (e)NodeB cell is an open mode; or allows the access of a member user if the access mode of the target home (e)NodeB cell is a closed mode; or allows the access of all users if the access mode of the target home (e)NodeB cell is a hybrid mode. In this embodiment, the source eNodeB/source radio network controller/source home (e)NodeB gateway further determines whether or not the UE is a member user of the home (e)NodeB cell as the target home (e)NodeB is in a hybrid mode.

Step 301: the source eNodeB/source radio network controller/source home (e)NodeB gateway sends a relocation required/handover required to the core network according to the determination result of step 300, wherein the user access mode is encapsulated in the relocation required/handover required.

Here, the relocation required, which is applicable to a UMTS system, is sent to the core network via the source radio network controller or the source home NodeB gateway; and the handover required, which is applicable to an LTE system, is sent to the core network via the source eNodeB or the source home eNodeB gateway. The user access mode of the UE, that is, the information on whether or not the UE is a member user of the target hybrid home (e)NodeB cell, is included in the relocation required/handover required if the target home (e)NodeB cell is in a hybrid mode. In the specific implementation process, the user access mode may be indicated in the following way: the UE is indicated to be a member user or a nonmember user by respective explicit identifier, or the UE is indicated to be a member user by an explicit identifier, and the UE is indicated to be a nonmember user by the absence of an explicit identifier. If the target home (e)NodeB cell is in a closed mode or an open mode, the aforementioned information is not included in the relocation required/handover required.

Step 302: after receiving the relocation required/handover required, the core network sends a relocation request/handover request to the target home (e)NodeB gateway, wherein the user access mode is encapsulated in the relocation request/handover request.

Here, the relocation request is applicable to a UMTS system, and the handover request is applicable to an LTE system. In the LTE system, if a home eNodeB is directly connected with a core network, the core network directly sends a handover request to the target home eNodeB, this operation is also applicable to other embodiments. The user access mode information informed by the source eNodeB/source radio network controller/source home (e)NodeB gateway in step 301, that is, the information on whether the UE is a member user of the target hybrid home (e)NodeB cell, is included in the relocation request or handover request. In the specific implementation process, the user access mode may be indicated in the following way: the UE is indicated to be a member user or a nonmember user by respective explicit identifier, or the UE is indicated to be a member user by an explicit identifier, and the UE is indicated to be a nonmember user by the absence of an explicit identifier. If the target home (e)NodeB cell is in a closed mode or an open mode, the aforementioned information is not included in the relocation request/handover request.

It should be noted here that in order to make this embodiment more typical, it is assumed in this embodiment that the source eNodeB/source radio network controller/source home (e)NodeB gateway and the target home (e)NodeB/target home (e)NodeB gateway belong to the same core network. If the source NodeB/source radio network controller/source home (e)NodeB gateway and the target home (e)NodeB/target home (e)NodeB gateway belong to different core networks, the message is first sent to the target core network connected with the target home (e)NodeB gateway and then sent to the target home (e)NodeB gateway via the target core network. The aforementioned assumption is also applicable to other embodiments of this method.

Step 303: after receiving the relocation request/handover request from the core network, the target home (e)NodeB gateway sends the relocation request/handover request to the target home (e)NodeB, wherein the user access mode is encapsulated in the relocation request/handover request.

Here, the user access mode information informed by the core network in step 302, that is, the information on whether the UE is a member user of the target hybrid home (e)NodeB cell, is included in the relocation request or handover request. In the specific implementation process, the user access mode may be indicated in the following way: the UE is indicated to be a member user or a nonmember user by respective explicit identifier, or the UE is indicated to be a member user by an explicit identifier, and the UE is indicated to be a nonmember user by the absence of an explicit identifier. If the target home (e)NodeB cell is in a closed mode or an open mode, the aforementioned information is not included in the relocation request/handover request.

Step 304: after receiving the relocation request/handover request, the target home (e)NodeB determines the user access mode of the UE, if the UE is a member user, it allows the access of the UE; or if the UE is a nonmember user, it makes a determination on whether to allow the access of the UE according to the current load condition and the resource utilization condition of the home (e)NodeB. In the case that the access of the UE is allowed, the target home (e)NodeB distributes radio resources for the UE and sends a relocation request acknowledge or a handover request acknowledge to the target home (e)NodeB gateway.

Here, the relocation request acknowledge is applicable to a UMTS system, and the handover request acknowledge is applicable to an LTE system. When the access of the UE is not allowed, the specific operations of the target home (e)NodeB can be understood by reference to the detailed description given in prior art, this embodiment is only given to make a brief description on the subsequent flows of the handover in the case that the access of the UE is allowed, and the processing described in this embodiment is also applicable to other embodiments.

Step 305: after receiving the relocation request acknowledge/handover request acknowledge, the target home (e)NodeB gateway forwards the relocation request acknowledge/handover request acknowledge to the core network.

Step 306: after receiving the relocation request acknowledge/handover request acknowledge, the core network sends a relocation command/handover command to the source eNodeB/source radio network controller/source home (e)NodeB gateway.

Here, the relocation command is applicable to a UMTS system, and the handover command is applicable to an LTE system.

Method Embodiment 2

Access control is carried out by a network element at a core network side.

Figure 4:
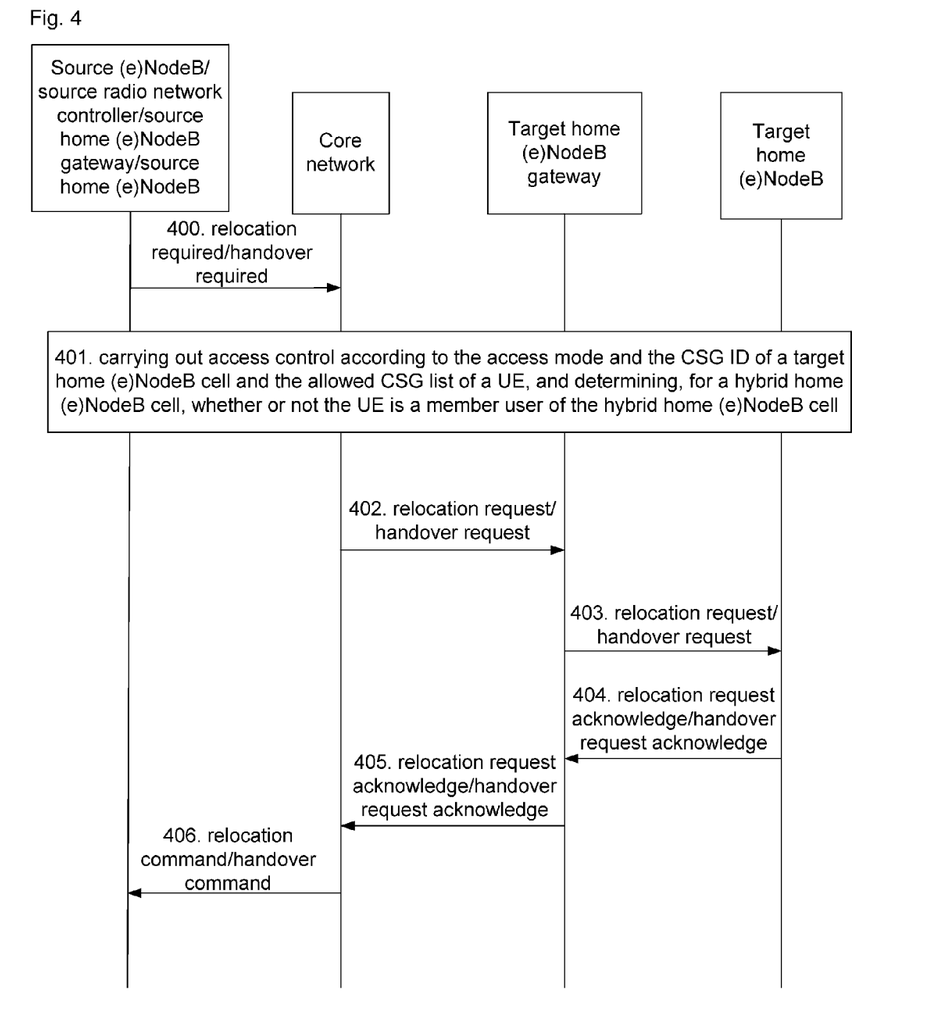
FIG. 4 is a schematic diagram illustrating a realization flow of embodiment 2 of the method of the present invention.

FIG. 4 is a schematic diagram illustrating a realization flow of the informing of a user access mode when access control is carried out by a core network during a handover to a hybrid home (e)NodeB cell, the core network herein refers to an MME/SGSN/MSC. This embodiment is applicable to the handover from a macro cell or home NodeB cell to a hybrid home NodeB cell in a UMTS system, where access control is carried out by an SGSN/MSC. This embodiment is also applicable to the handover from a macro NodeB or home eNodeB cell to a hybrid home eNodeB cell in an LTE system, where access control is carried out by an MME.

In order to make this embodiment more typical, it is assumed in FIG. 4 that a target home eNodeB is connected to a core network via a home eNodeB gateway when this embodiment is applied to an LTE system, and the method comprises the following steps.

Step 400: the source eNodeB/source radio network controller/source home (e)NodeB gateway sends a relocation required/handover required to the core network.

Here, the relocation required is applicable to a UMTS system, and the handover required is applicable to an LTE system. The source eNodeB sends the handover required to the core network when an LTE macro cell attempts to hand over a UE to the hybrid home eNodeB cell. The source radio network controller sends the relocation required to the core network when a UMTS macro cell attempts to hand over a UE to the hybrid home NodeB cell. The source home (e)NodeB gateway sends the relocation required or handover required to the core network when a UMTS home NodeB or a home eNodeB in an LTE that is connected to the core network via a home (e)NodeB gateway attempts to hand over a UE to the hybrid home (e)NodeB cell. The source home eNodeB sends the handover required to the core network when a home eNodeB in an LTE that is directly connected to the core network attempts to hand over a UE to the hybrid home eNodeB cell.

Step 401: after receiving the relocation required or handover required, the core network determines the target cell is a home (e)NodeB cell, acquires the access mode and the CSG ID of the target home (e)NodeB cell, and carries out access control according to the acquired information in combination with the allowed CSG list of the UE stored in the core network, that is, allows the access of all users if the access mode of the target home (e)NodeB cell is an open mode; or allows the access of a member user if the access mode of the target home (e)NodeB cell is a closed mode; or allows the access of all users if the access mode of the target home (e)NodeB cell is a hybrid mode. In this embodiment, the core network further determines whether or not the UE is a member user of the home (e)NodeB cell as the target home (e)NodeB is in a hybrid mode.

Step 402: the core network sends a relocation request or handover request to the target home (e)NodeB gateway according to the determination result of step 401, if the target home (e)NodeB cell is in a hybrid mode, then the user access mode, that is, the information on whether or not the UE is a member user of the target hybrid home (e)NodeB cell, is included in the relocation request or handover request. In the specific implementation process, the user access mode may be indicated in the following way: the UE is indicated to be a member user or a nonmember user by respective explicit identifier, or the UE is indicated to be a member user by an explicit identifier, and the UE is indicated to be a nonmember user by the absence of an explicit identifier. If the target home (e)NodeB cell is in a closed mode or an open mode, the aforementioned information is not included in the relocation request/handover request.

Step 403: after receiving the relocation request or handover request from the core network, the target home (e)NodeB gateway sends the target home (e)NodeB the relocation request or handover request including the user access mode informed by the core network in step 401, that is, the information on whether or not the UE is a member user of the target hybrid home (e)NodeB cell. In the specific implementation process, the user access mode may be indicated in the following way: the UE is indicated to be a member user or a nonmember user by respective explicit identifier, or the UE is indicated to be a member user by an explicit identifier, and the UE is indicated to be a nonmember user by the absence of an explicit identifier. If the target home (e)NodeB cell is in a closed mode or an open mode, the aforementioned information is not included in the relocation request/handover request.

Steps 404-406: the same steps as those described in the steps 304-306 of embodiment 1.

Method Embodiment 3

Access control is carried out by a network element at a target network side.

Figure 5:
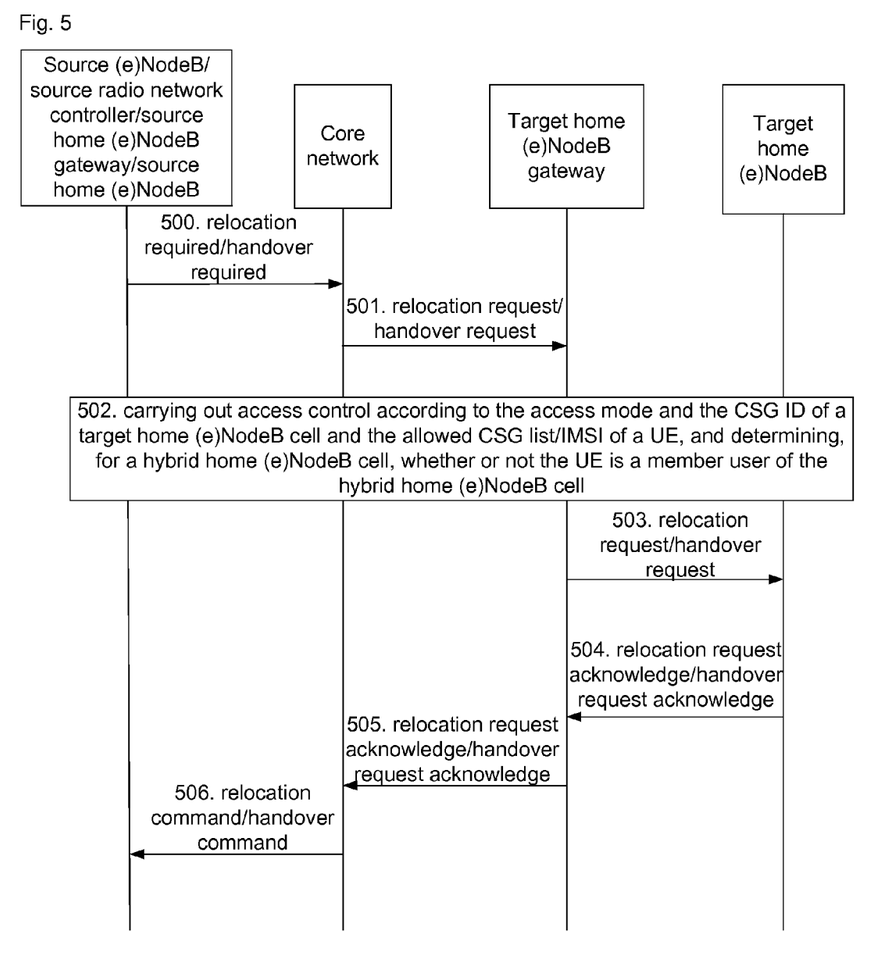
FIG. 5 is a schematic diagram illustrating a realization flow of embodiment 3 of the method of the present invention.

FIG. 5 is a schematic diagram illustrating a realization flow of the informing of a user access mode when access control is carried out by a target home (e)NodeB gateway during a handover to a hybrid home (e)NodeB cell. This embodiment is applicable to the handover from a macro cell or home NodeB cell to a hybrid home NodeB cell in a UMTS system, and is also applicable to the handover from a macro eNodeB or home eNodeB cell to a hybrid home eNodeB cell in an LTE system. The method comprises the following steps.

Step 500: the source eNodeB or the source radio network controller or the source home (e)NodeB gateway sends a relocation required or handover required to the core network.

Step 501: after receiving the relocation required or the handover required, the core network sends a relocation request or handover request to the target home (e)NodeB gateway.

Step 502: after receiving the relocation request or the handover request, the target home NodeB gateway carries out access control according to the IMSI of the UE and the access mode and the HNB ID of the target home NodeB in a UMTS, or the target home eNodeB gateway carries out access control according to the acquired allowed CSG list of the UE and the acquired access mode and CSG ID of the target home eNodeB in an LTE system, that is, allows the access of all users if the access mode of the target home (e)NodeB cell is an open mode; or allows the access of a member user if the access mode of the target home (e)NodeB cell is a closed mode; or allows the access of all users if the access mode of the target home (e)NodeB cell is a hybrid mode. In this embodiment, the home (e)NodeB gateway further determines whether or not the UE is a member user of the home (e)NodeB cell as the target home (e)NodeB is in a hybrid mode.

Step 503: the home (e)NodeB gateway sends a relocation request or handover request to the target home (e)NodeB according to the determination result of step 502, if the target home (e)NodeB cell is in a hybrid mode, the user access mode, that is, the information on whether or not the UE is a member user of the target hybrid home (e)NodeB cell, is included in the relocation request or handover request. In the specific implementation process, the user access mode may be indicated in the following way: the UE is indicated to be a member user or a nonmember user by respective explicit identifier, or the UE is indicated to be a member user by an explicit identifier, and the UE is indicated to be a nonmember user by the absence of an explicit identifier. If the target home (e)NodeB cell is in a closed mode or an open mode, the aforementioned information is not included in the relocation request/handover request.

Steps 504-506: the same steps as steps 304-306 described in embodiment 1.

Method embodiment 4

The source home (e)NodeB and the target home (e)NodeB are connected via a same home (e)NodeB gateway.

Figure 6:
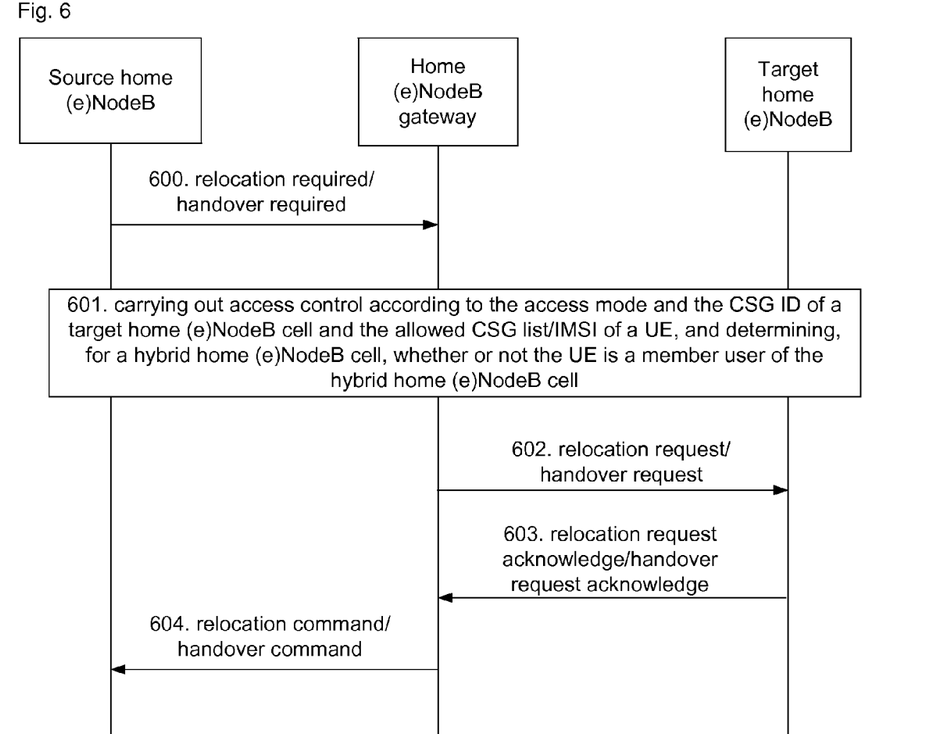
FIG. 6 is a schematic diagram illustrating a realization flow of embodiment 4 of the method of the present invention.

In embodiments 1 and 3 above, if the source home (e)NodeB and the target home (e)NodeB are connected via the same home (e)NodeB gateway, then as shown in FIG. 6, no message is forwarded by the core network, and the method comprises the following steps.

Step 600: the source home (e)NodeB sends a relocation required or handover required to a home (e)NodeB gateway;

Steps 601 and 602: the same steps as steps 502 and 503 described in embodiment 3;

Step 603: the same step as step 304 described in embodiment 1; and

Step 604: after receiving the relocation request acknowledge or the handover request acknowledge, the home (e)NodeB gateway sends a relocation command or handover command to the source home (e)NodeB.

Figure 7:
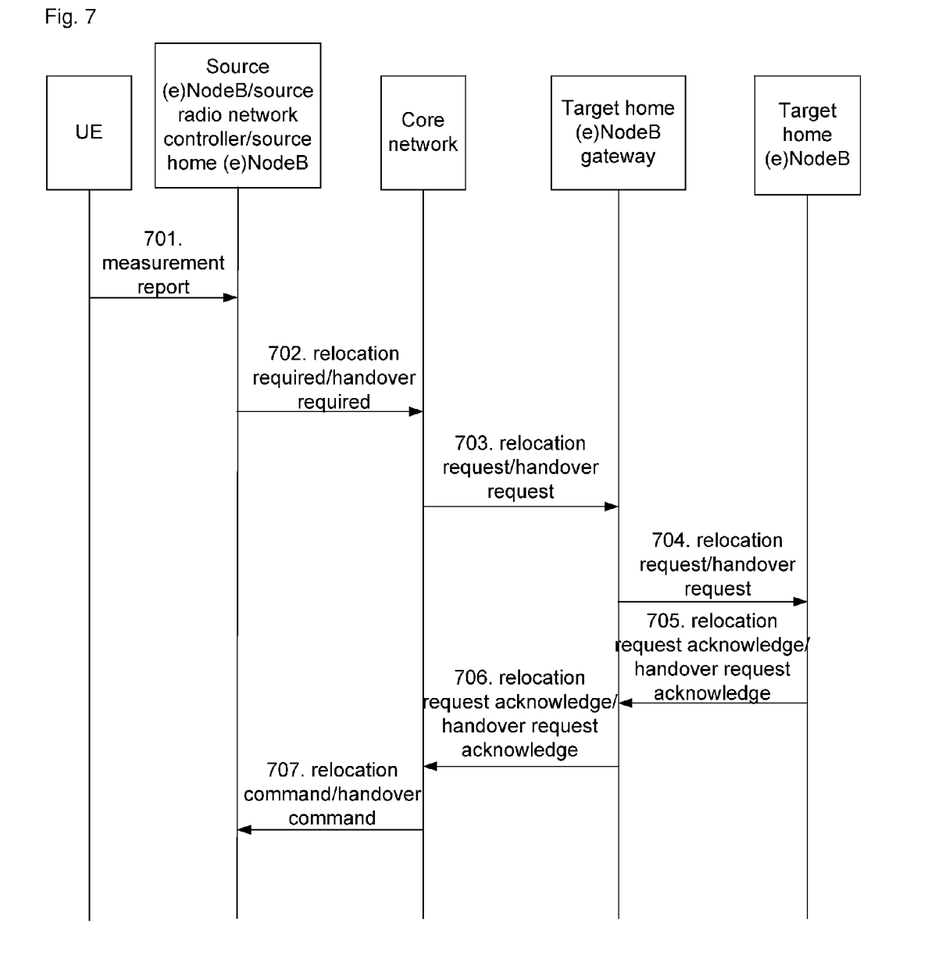
FIG. 7 is a schematic diagram illustrating a realization flow of the determination of a user access mode at a user equipment side according to the present invention.

In all the aforementioned method embodiments, if the UE has acquired the access mode and the CSG ID of the target hybrid home (e)NodeB cell before handover and has made a determination on whether the UE is a member user of the target hybrid home (e)NodeB cell according to the acquired information in combination with the allowed CSG list stored in the USIM of the UE, then the source network side, the core network and the target network side may directly send the UE-reported determination result to the target hybrid home (e)NodeB cell, without making a determination on whether the UE is a member user of the target hybrid home (e)NodeB cell, this process is applicable to the handover from a macro cell or a home (e)NodeB cell to the target hybrid home (e)NodeB cell in a UMTS or an LTE. FIG. 7 shows an example of a flow of access control, however, the access control may also be carried out at the source network side, the core network side or the target network side through the following specific steps.

Step 701: the UE acquires the access mode and the CSG ID of the target hybrid home (e)NodeB cell, determines whether or not the UE is a member user of the target hybrid home (e)NodeB cell according to the acquired information in combination with the allowed CSG list stored in a USIM, and sends a measurement report to the source NodeB/source radio network controller/source home (e)NodeB, wherein an user access mode, that is, information on whether or not the UE is a member user of the target hybrid home (e)NodeB cell, is included in the measurement report. In the specific implementation process, the user access mode may be indicated in the following way: the UE is indicated to be a member user or a nonmember user by respective explicit identifier, or the UE is indicated to be a member user by an explicit identifier, and the UE is indicated to be a nonmember user by the absence of an explicit identifier; and Steps 702-707: the same steps as steps 301-306 described in embodiment 1.

An information system of a user access mode comprises: an informing unit at a network side, which is used for a network element at the network side to inform, when attempting to hand over a UE to a target hybrid home (e)NodeB cell, a target hybrid home (e)NodeB of a current user access mode of the UE via a handover signaling, wherein the user access mode is information on whether or not the UE is a member user of the target hybrid home (e)NodeB cell.

Here, the system further comprises a determination unit, which is used for the UE or the network element at the network side to determine whether or not the UE is a member user of the target hybrid home (e)NodeB cell and determine the user access mode.

Here, the informing unit further comprises an indication module which is used for indicating whether or not the UE is a member user of the target hybrid home (e)NodeB cell. There are two specific indication methods adopted by the indication module: 1, the UE is indicated to be a member user or a nonmember user of the target hybrid home (e)NodeB cell by respective explicit identifier; and 2: the UE is indicated to be a member user of the target hybrid home (e)NodeB cell by an explicit identifier, and the UE is indicated to be a nonmember user of the target hybrid home (e)NodeB cell by the absence of an explicit identifier.

It should be noted here that the aforementioned home (e)NodeB in a UMTS is represented by Home (e)NodeB (H(e)NB for short), the aforementioned home (e)NodeB gateway in a UMTS is represented by Home NodeB Gateway (HNB GW for short), and an evolved home NodeB, that is, the aforementioned home (e)NodeB in an LTE system is represented by Home E-UTRAN NodeB (HeNB for short).

Here, the aforementioned HNB and HeNB may be totally referred to as H(e)NB, in this case, a home (e)NodeB cell may be represented by H(e)NB cell; a home (e)NodeB identifier may be represented by H(e)NB ID; an open home (e)NodeB cell may be represented by open H(e)NB cell; a closed home (e)NodeB cell may be represented by closed CSG cell (CSG cell for short); and a hybrid home (e)NodeB cell may be represented by hybrid H(e)NB cell.

A source eNodeB is represented by E-UTRAN NodeB (eNB for short); a source radio network controller is represented by Radio Network Controller (RNC for short); a relocation required is represented by Relocation Required; a handover required is represented by Handover Required; a relocation request is represented by Relocation Request; a handover request is represented by Handover Request; a relocation request acknowledge is represented by Relocation Request Acknowledge; a handover request acknowledge is represented by Handover Request Acknowledge; a relocation command is represented by Relocation Command; and a handover command is represented by Handover Command.

The mentioned above are only preferred embodiments of the present invention but not limitation to the protection scope of the present invention.

What is claimed is:

1. An information method of a user access mode to provide access control for handover to a target hybrid home (e)NodeB, comprising: when attempting to hand over a User Equipment (UE) to a target hybrid home (e)NodeB cell, a network element at a network side informing a target hybrid home (e)NodeB of a current user access mode of the UE via a handover signaling, wherein
the user access mode is information on whether or not the UE is a member user of the target hybrid home (e)NodeB cell;
wherein the network element at the network side is a network element at a source network side, a network element at a core network side, or a network element at a target network side;
when access control is carried out by the network element at a source network side, the method further comprises:
determining, by the network element at the source network side, whether or not the UE is a member user of the target hybrid home (e)NodeB cell and determining the user access mode;
handovering, by the network element at the source network side after carrying out access control, the UE to the target hybrid home (e)NodeB and encapsulating the user access mode in the handover signaling;
informing, by the network element at the source network side, the target hybrid home (e)NodeB of the user access mode in the handover signaling; and
acquiring, by the target hybrid home (e)NodeB, the user access mode, allowing the access of the UE if the user access mode indicates that the UE is a member user of the target hybrid home (e)NodeB cell, or selectively allowing the access of the UE according to current related information of the home (e)NodeB if the user access mode indicates that the UE is a nonmember user of the target hybrid home (e)NodeB cell;
when access control is carried out by the network element at a core network side, the method further comprises:
determining, by the network element at the core network side, whether or not the UE is a member user of the target hybrid home (e)NodeB cell and determining the user access mode;
handovering, by the network element at the core network side after carrying out access control, the UE to the target hybrid home (e)NodeB and encapsulating the user access mode in the handover signaling;
informing, by the network element at the core network side, the target hybrid home (e)NodeB of the user access mode in the handover signaling; and
acquiring, by the target hybrid home (e)NodeB, the user access mode, allowing the access of the UE if the user access mode indicates that the UE is a member user of the target hybrid home (e)NodeB cell, or selectively allowing the access of the UE according to current related information of the home (e)NodeB if the user access mode indicates that the UE is a nonmember user of the target hybrid home (e)NodeB cell;
when access control is carried out by the network element at a target network side, the method further comprises:
determining, by the network element at the target network side, whether or not the UE is a member user of the target hybrid home (e)NodeB cell and determining the user access mode;
handovering, by the network element at the target network side after carrying out access control the UE to the target hybrid home (e)NodeB and encapsulating the user access mode in the handover signaling;
informing, by the network element at the target network side, the target hybrid home (e)NodeB of the user access mode in the handover signaling; and
acquiring, by the target hybrid home (e)NodeB, the user access mode, allowing the access of the UE if the user access mode indicates that the UE is a member user of the target hybrid home (e)NodeB cell, or selectively allowing the access of the UE according to current related information of the home (e)NodeB if the user access mode indicates that the UE is a nonmember user of the target hybrid home (e)NodeB cell.

2. The method according to claim 1, further comprising: the UE or the network element at the network side determining the user access mode.

3. The method according to claim 1, wherein the network element at the source network side is a source eNodeB, a source radio network controller, or a source home (e)NodeB gateway.

4. The method according to claim 1, wherein the network element at the core network side is a mobility management entity, a serving GPRS supporting node, or a mobile service switching center.

5. The method according to claim 1, wherein the network element at the target network side is a home (e)NodeB gateway.

6. The method according to claim 1, wherein the user access mode is indicated in the following way:
the UE is indicated to be a member user or a nonmember user of the target hybrid home (e)NodeB cell by respective explicit identifier; or
the UE is indicated to be a member user of the target hybrid home (e)NodeB cell by an explicit identifier, and the UE is indicated to be a nonmember user of the target hybrid home (e)NodeB cell by the absence of an explicit identifier.

7. The method according to claim 1, wherein the step that informing, by the network element at the source network side, the target hybrid home (e)NodeB of the user access mode further comprises:
the network element at the source network side sends a relocation required/handover required to the core network, wherein the user access mode is encapsulated in the relocation required/handover required;

the core network acquires the user access mode, encapsulates the user access mode in a relocation request/handover request and then sends the relocation request/handover request to the target home (e)NodeB gateway; and the target home (e)NodeB gateway forwards the relocation request/handover request to the target hybrid home (e)NodeB;

the step that informing, by the network element at the core network side, the target hybrid home (e)NodeB of the user access mode further comprises:

the core network receives a relocation required/handover required from the network element at the source network side;

the core network sends a relocation request/handover request to the target home (e)NodeB gateway, wherein the user access mode is encapsulated in the relocation request/handover request; and the target home (e)NodeB gateway forwards the relocation request/handover request to the target hybrid home (e)NodeB;

the step that informing, by the network element at the target network side, the target hybrid home (e)NodeB of the user access mode further comprises:

the target home (e)NodeB gateway receives a relocation request/handover request;

wherein the relocation request/handover request is sent from the network element at the source network side to the core network and is sent from the core network to the target home (e)NodeB gateway; and the target home (e)NodeB gateway sends a relocation request/handover request to the target hybrid home (e)NodeB, wherein the user access mode is encapsulated in the relocation request/handover request.

8. An information system of a user access mode to provide access control for handover to a target hybrid home (e)NodeB, comprising:

an informing unit at a network side, which is used for a network element at the network side to inform, when attempting to hand over a UE to a target hybrid home (e)NodeB cell, a target hybrid home (e)NodeB of a current user access mode of the UE via a handover signaling, wherein the user access mode is information on whether or not the UE is a member user of the target hybrid home (e)NodeB cell; and wherein the network element at the network side is a network element at a source network side, a network element at a core network side, or a network element at a target network side;

a determination unit at the network side, when access control is carried out by the network element at a source network side, the determination unit is used for the network element at the source network side to determine whether or not the UE is a member user of the target hybrid home (e)NodeB cell, and determine the user access mode;

after carrying out access control, the network element at a source network side handovers the UE to the target hybrid home (e)NodeB; and the informing unit is further used for the network element at the source network side to encapsulate the user access mode in the handover signaling and inform the target hybrid home (e)NodeB of the user access mode in the handover signaling; wherein the user access mode is acquired by the target hybrid home (e)NodeB, the access of the UE is allowed if the user access mode indicates that the UE is a member user of the target hybrid home (e)NodeB cell, or the access of the UE is selectively allowed according to current related information of the home (e)NodeB if the user access mode indicates that the UE is a nonmember user of the target hybrid home (e)NodeB cell;

when access control is carried out by the network element at a core network side, the determination unit is used for the network element at the core network side to determine whether or not the UE is a member user of the target hybrid home (e)NodeB cell, and determine the user access mode;

after carrying out access control, the network element at the core network side handovers the UE to the target hybrid home (e)NodeB and the informing unit is further used for the network element at the core network side to encapsulate the user access mode in the handover signaling and inform the target hybrid home (e)NodeB of the user access mode in the handover signaling; wherein the user access mode is acquired by the target hybrid home (e)NodeB, the access of the UE is allowed if the user access mode indicates that the UE is a member user of the target hybrid home (e)NodeB cell, or the access of the UE is selectively allowed according to current related information of the home (e)NodeB if the user access mode indicates that the UE is a nonmember user of the target hybrid home (e)NodeB cell;

when access control is carried out by the network element at a target network side, the determination unit is used for the network element at the target network side to determine whether or not the UE is a member user of the target hybrid home (e)NodeB cell, and determine the user access mode;

after carrying out access control, the network element at the target network side handovers the UE to the target hybrid home (e)NodeB and the informing unit is further used for the network element at the target network side to encapsulate the user access mode in the handover signaling and inform the target hybrid home (e)NodeB of the user access mode in the handover signaling; wherein the user access mode is acquired by the target hybrid home (e)NodeB, the access of the UE is allowed if the user access mode indicates that the UE is a member user of the target hybrid home (e)NodeB cell, or the access of the UE is selectively allowed according to current related information of the home (e)NodeB if the user access mode indicates that the UE is a nonmember user of the target hybrid home (e)NodeB cell.

9. The system according to claim 8, wherein the determination unit is further used for the UE or the network element at the network side to determine whether or not the UE is a member user of the target hybrid home (e)NodeB cell and determine the user access mode.

10. The system according to claim 9, wherein the informing unit further comprises an indication module, which is used for indicating whether or not the UE is a member user of the target hybrid home (e)NodeB cell, wherein the UE is indicated to be a member user or a nonmember user of the target hybrid home (e)NodeB cell by respective explicit identifier; or the UE is indicated to be a member user of the target hybrid home (e)NodeB cell by an explicit identifier, and the UE is indicated to be a nonmember user of the target hybrid home (e)NodeB cell by the absence of an explicit identifier.

11. The system according to claim 8, wherein the informing unit further comprises an indication module, which is used for indicating whether or not the UE is a member user of the target hybrid home (e)NodeB cell, wherein the UE is indicated to be a member user or a nonmember user of the target hybrid home (e)NodeB cell by respective explicit identifier; or the UE is indicated to be a member user of the target hybrid home (e)NodeB cell by an explicit identifier, and the UE is indicated to be a nonmember user of the target hybrid home (e)NodeB cell by the absence of an explicit identifier.

\* \* \* \* \*